Oct. 7, 1941.    H. F. MARANVILLE    2,257,913
SUSPENSION SYSTEM AND METHOD
Filed June 6, 1938    3 Sheets—Sheet 1

INVENTOR
*Harvey F. Maranville*
BY
*Evans & McCoy*
ATTORNEYS

INVENTOR
Harvey F. Maranville
BY
Evans + McCoy
ATTORNEYS

Oct. 7, 1941.   H. F. MARANVILLE   2,257,913
SUSPENSION SYSTEM AND METHOD
Filed June 6, 1938   3 Sheets-Sheet 3
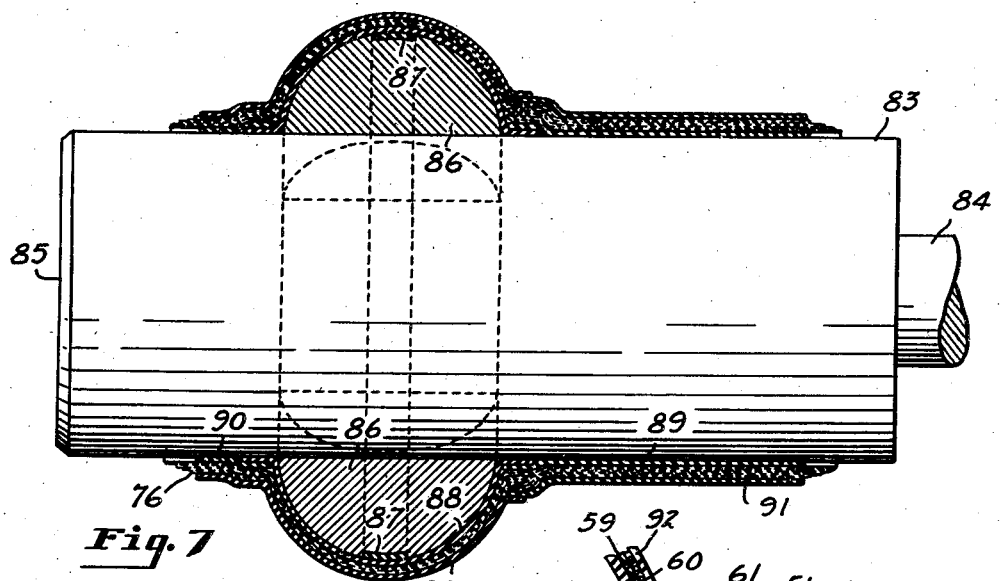
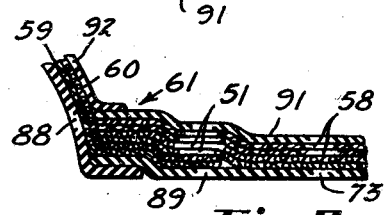
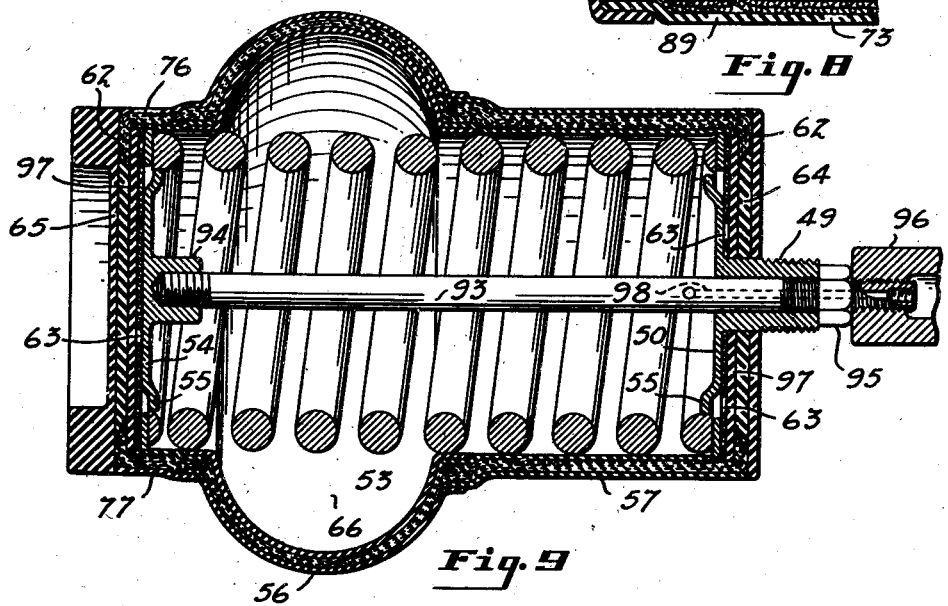
INVENTOR
Harvey F. Maranville
BY
Evans + McCoy
ATTORNEYS Patented Oct. 7, 1941

2,257,913

UNITED STATES PATENT OFFICE 2,257,913

SUSPENSION SYSTEM AND METHOD

Harvey F. Maranville, Akron, Ohio, assignor to The General Tire & Rubber Company, Akron, Ohio, a corporation of Ohio Application June 6, 1938, Serial No. 212,018

15 Claims. (Cl. 267—35)

This invention relates to suspension devices and more particularly to a fluid suspension device and system for supporting a vehicle on a set of wheels.

In accordance with the invention, a set of springs are interposed between the wheels and frame of a vehicle and the springs are enclosed in airtight casings which serve as cushions auxiliary to the springs for carrying the weight of the vehicle on the wheels and particularly to resist excessive loadings such as are caused by road shocks and the like.

It is an object of the invention to provide an improved suspension device in which a compressed spring is disposed in a normally unstressed airtight casing.

Another object is to provide a suspension device for a vehicle in which a spring is arranged to support the normal weight of the vehicle and is supplemented by an inflatable pneumatic casing which is arranged to resist both expansion and contraction of the spring from the normal position of the latter. A more limited object is to provide such a device in which the resistance of the casing can be varied while the vehicle is in motion.

Another object is to provide a vehicle suspension system in which the cushioning of the vehicle frame on the wheels is effected by metal springs in combination with variable capacity air cushions. It has previously been proposed to furnish air to a number of air cushions supporting a vehicle from a central supply tank. However, because of the inherent capacity for air or other fluid to travel from one supporting device to another through the interconnected system, the support for the vehicle at the various points of suspension has been relatively indefinite and more or less out of the control of the operator. It is, therefore, a more specific object of the invention to provide a vehicle suspension system in which the several fluid inflated devices may be individually regulated by the operator of the vehicle while the latter is in motion.

In suspension systems for automotive vehicles, such as passenger cars, helical coil compression springs are frequently used. These springs are usually of materially greater axial length than diameter so as to afford in a minimum amount of space the maximum cushioning effect. On account of space and clearance limitations in the design of present-day automobiles, an airtight fluid casing for enclosing such helical springs preferably must not have unrestricted lateral distension or flexing. It is, therefore, another object of the invention to provide a suspension device, and a method of making the same, which includes a helical compression spring enclosed in an airtight pneumatic casing, the latter being constructed so that during changes in length it has limited lateral deflection or deformation for a portion of its length and relatively no lateral deformation or deflection throughout another portion of its length.

Other objects and advantages will become apparent from the following detailed description of the invention made in connection with the accompanying drawings, in which:

Fig. 7 is a diagrammatic longitudinal sectional view showing one of the pneumatic casings in the process of construction on a cylindrical drum or mandrel;

Fig. 8 is a detail view in section showing the construction of the joint between the flexing and nonflexing portions of the casing of Fig. 7 and enlarged with respect thereto; and Fig. 9 is a longitudinal sectional view through the pneumatic suspension device in the process of construction, showing the compressed helical coil spring in place within the airtight casing.

Figure 1:
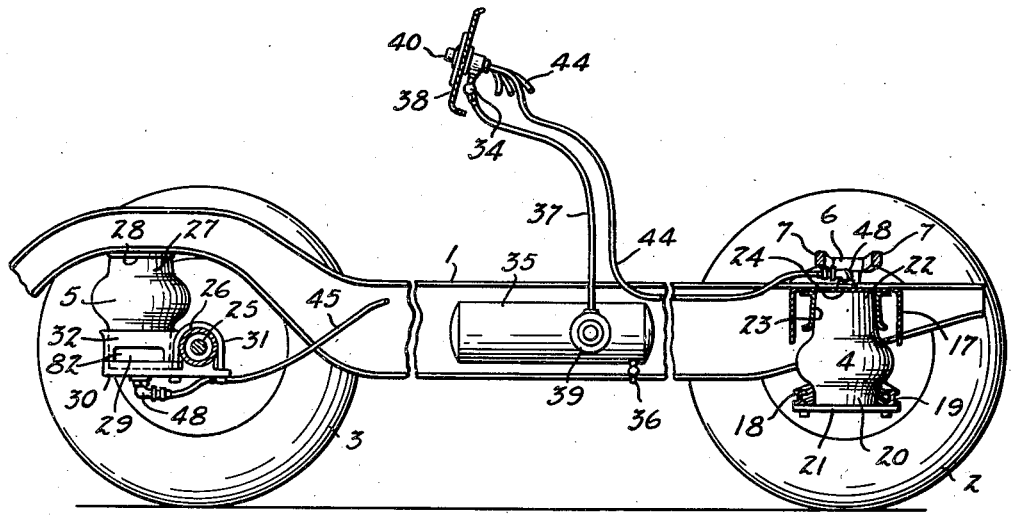
Figure 1 is a foreshortened diagrammatic side elevational view with parts removed and partly in section showing an automobile frame and wheels incorporating the present invention.
Figure 2:
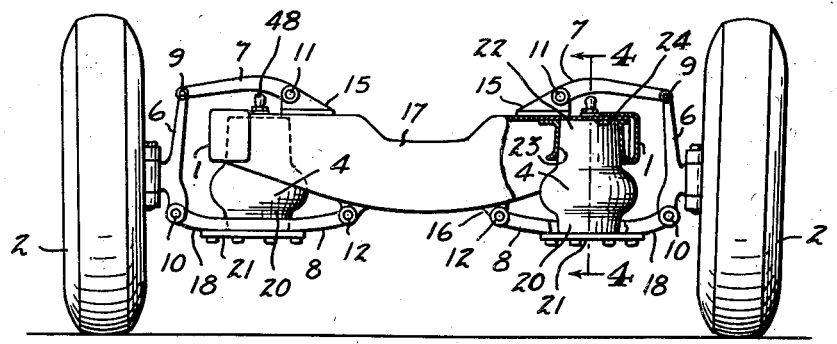
Fig. 2 is a diagrammatic front end elevational view partly in section and with parts removed of the vehicle shown in Fig. 1.

The suspension device of the present invention is illustrated in connection with a passenger automobile. It can be used, of course, in other applications with appropriate changes in design and arrangement. Only the parts essential to an understanding of the invention have been shown in the drawings, it being understood that the vehicle will be equipped with an engine, body, steering mechanism, and other structures in accordance with the usual practice. A frame 1 is mounted on front and rear wheels 2 and 3 respectively by means of the suspension devices of the present invention, indicated generally by the numeral 4 for the front wheels and by the numeral 5 for the rear wheels. The front wheels are rotatably mounted on spindles extending laterally from substantially vertically disposed link members 6, the ends of which are pivotally connected to top and bottom supporting levers 7 and 8, respectively, at 9 and 10. These support levers for each front wheel are pivotally secured at 11 and 12 to top and bottom bracket members 15 and 16 respectively, mounted on cross member 17 extending transversely between the longitudinal members of the frame 1 at the front end of the vehicle. The lever members 7 and 8 which are substantially parallel with one another thus have a parallel pivotal movement about the pivots 11 and 12 so that the link member 6 is maintained in a substantially upright or vertical position as the wheels 2 rise and fall in running over road irregularities. This type of wheel suspension is commonly referred to as "knee action," since each of the wheels is mounted independently of the other to minimize distortion and movement of the frame 1 as the vehicle passes over irregularities in the road surface.

Each of the bottom lever support members 8 is bifurcated and arms 18 and 19 thereof receive between them base 20 of one of the suspension devices 4, as shown in Fig. 1. A pressure member or plate 21 is secured to the under side of the arms 18 and 19 of the support lever 8 and engages the bottom end or under side of the base 20 of the suspension device. Top end 22 of the suspension device is received in a socket 23 in the cross member 17 and rests against a bearing member or plate portion 24 at the end of the socket.

Each of the rear wheels 3 is rigidly secured on an axle shaft 25 connected in the usual manner through a differential and transmission to the drive engine (not shown). The wheel axles 25 extend through and are journaled in a housing or dead axle 26. The rear end of the frame 1 is supported on the housing 26 by means of the rear suspension devices 5 which are similar to the front suspension devices 4. Upper end 27 of each of the spring devices 5 bears against a downwardly directed pressure member or portion 28 on the frame 1 while lower ends 29 rest on bearing plates 30 which extend under the housing 26 and are secured thereto by U-bolts 31. Desirably, a socket for the lower end 29 of each of the spring devices 5 may be formed by an annular band 32 which surmounts the plate 30 to engage the cylindrical side of the cushioning or suspension device.

Figure 3:
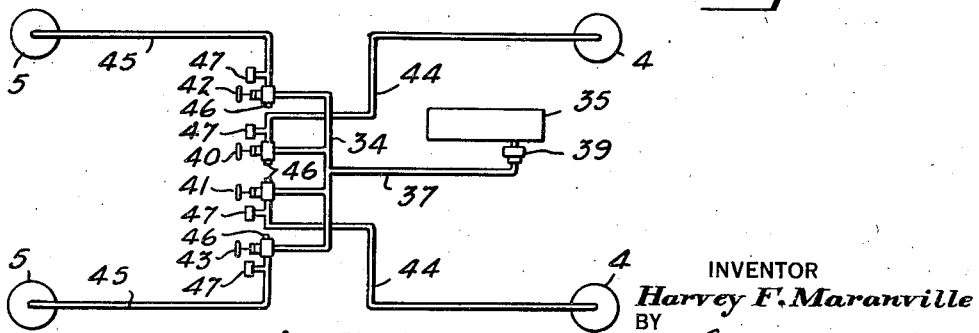
Fig. 3 is a diagrammatic plan view showing the arrangement of the pneumatic devices and their controls and connections to a supply of pneumatic fluid.

Each of the suspension devices 4 and 5 is arranged to be inflated so as to vary its shock-absorbing characteristics and capacity. In order that the adjustment of the air pressure in the various suspension devices may be made while the vehicle is in motion, the present invention provides means by which each of the several suspension devices may separately be inflated or deflated from the instrument panel or dashboard of the vehicle. For this purpose a supply tank or receptacle 35 is mounted in any convenient position, such as between the longitudinal members of the frame 1, and is provided with an inlet valve 36 through which it may be inflated from time to time with air or other suitable pneumatic fluid. Conduit 37 leads from the tank 35 to instrument panel 38 of the vehicle and has interposed therein a pressure regulating valve 39. This valve is of a type commonly known, which is arranged to receive fluid at a high pressure and transmit it at a predetermined, substantially constant pressure, less than the pressure at which it is received. The conduit 37 terminates in a header 34 having four branches, one for each of the several suspension devices. These branches lead to shut-off valves 40 and 41 for the front left and right suspension devices 4 respectively, and shut-off valves 42 and 43 for the rear left and right suspension devices 5, respectively. The shut-off valves are diagrammatically shown in Fig. 3 and may be of any well known construction. The valves 40 and 41 are connected by conduits 44 to the front suspension devices 4, while the valves 42 and 43 are connected by conduits 45 to the rear suspension devices 5. Each of the valves has an outlet port 46 which communicates with the atmosphere, and the construction of the valves is such that the conduits 44 and 45 can be individually and selectively made to communicate with either (a) one of the branches from the header 34 to inflate the particular suspension device, or (b) the outlet port 46 of the valve to deflate the individual suspension device. Preferably, a pressure registering gauge 47 is connected to each of the conduits 44 and 45, so that the pressure in the several suspension devices may be known. Both the fluid supply valves and the pressure gauges may be mounted on the instrument panel 38 so that the operator of the vehicle can determine and regulate the state of the suspension system while the vehicle is in motion.

Each of the conduits 44 and 45 communicates with the interior of one of the suspension devices 4 and 5 through a fitting 48 which is threadedly secured in an extension portion 49 on an end plate or member 50 inside the casing of the suspension device.

Figure 4:
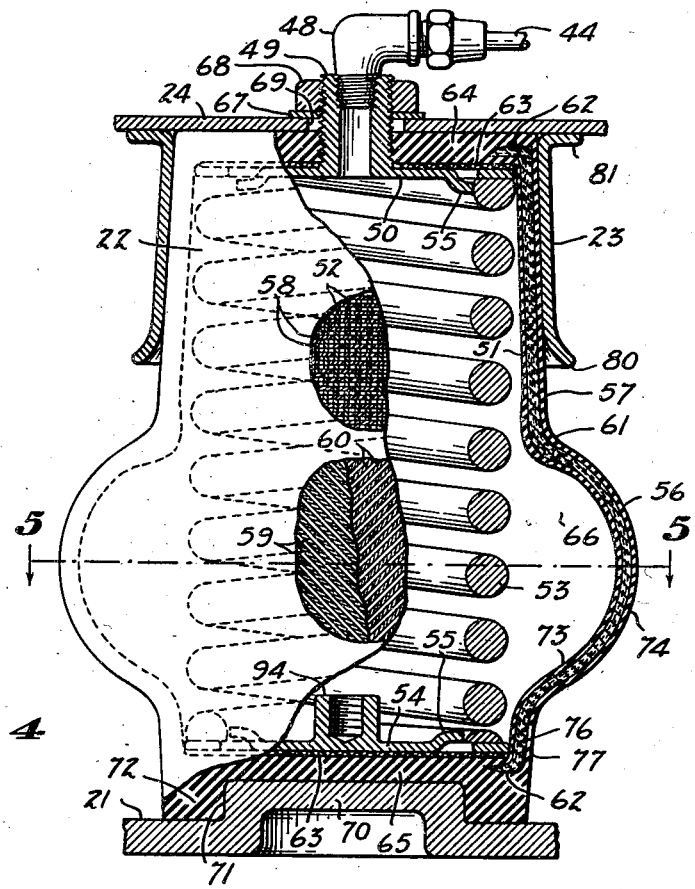
Fig. 4 is a detailed elevational view partly in section and with parts broken away showing one of the pneumatic cushioning devices in place between the frame and one of the front wheel mountings of the vehicle shown in the preceding figures.
Figure 5:
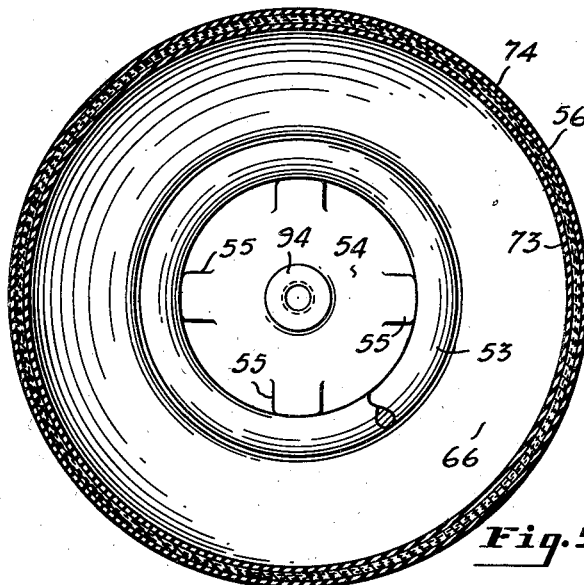
Fig. 5 is a transverse sectional view taken substantially on the line 5—5 of Fig. 4.

In Fig. 4 is illustrated the construction of the suspension devices 4 and 5. This drawing shows one of the front suspension devices 4 but the rear suspension devices 5 are similarly constructed and the explanation of the construction of one is equally applicable to the other. Each of the suspension devices comprises a helical coil spring 53 compressed between the end plate 50, previously mentioned, and another end plate or disk 54. The end plates 50 and 54 are circular in shape and of about the same outside diameter as the spring 53, preferably being slightly larger in diameter than the spring so as to insure a clearance between the casing walls and the end coils of the spring. The plates are made of a material having suitable characteristics of strength and toughness, such as steel. Raised portions 55 formed on the plates 50 and 54 engage the inside of the end turns of the spring 53 to center the latter on the plates.

The spring and end plates are enveloped in an airtight laminated casing formed of a suitable rubber composition and having a relatively deformable, resilient flexing portion 56 and a relatively rigid or nonflexing portion 57. The rigid portion 57 of the airtight casing is preferably substantially cylindrical in shape and disposed at one end of the suspension device. This portion of the casing is referred to as being substantially rigid and nonflexing since it incorporates reinforcing cords which extend circumferentially about the suspension device with respect to the axis thereof. If desired, this reinforcing of the rigid portion of the casing may be effected by the use of one or more layers or laminations of rubber sheet material incorporating woven fabric material disposed so as to have one group 58 of the component cords extending circumferentially about the casing of the suspension device and another group of cords 52 extending axially of the casing.

The resilient flexing portion 56 of the suspension device casing adjoins the rigid portion 57 and is of greater diameter. This deformable part has a somewhat spherical shape, being curved both axially and circumferentially. The rubber walls have incorporated therein a plurality of plies or laminations of cords which are disposed diagonally with respect to the axis of the suspension device. One or more of the plies in the resilient portion of the casing are arranged so that the individual cords 59 thereof extend in a direction from upper left to lower right, as viewed in Fig. 4, while one or more different plies are arranged so that cords 60 thereof extend in a direction from upper right to lower left, as viewed in Fig. 4. Desirably, laminations 51 of diagonally disposed cords are incorporated in the casing portion 57 to supplement the reinforcing effected by the fabric cords 58 and 52. The laminations in the flexing portion of the casing overlap the laminations in the nonflexing portion of the casing in the annular region indicated at 61, where the two portions of the casing merge into one another. The ends of the cord and fabric laminations extend around marginal edges of the end plates 50 and 54, as indicated at 62.

An adhesion layer 63 of woven fabric material impregnated with rubber is cemented to the outside surfaces of the end plates 50 and 54 beneath the overlapped margins of the casing portions 56 and 57. Resilient cushions 64 and 65 formed of rubber are secured to the adhesion layers 63 on the ends of the suspension device. The cushion 64 embraces the extension 49 through which the inflating fluid passes into and out of pneumatic chamber 66 defined by the end plates 50 and 51 and the casing portions 56 and 57.

The bosslike extension 49 extends beyond the surface of the cushion 64 through an aperture 69 in the bearing member or plate 24 and receives a washer 67 and nut 68 which secure the end plate 50 to the bearing plate 24. The extension 49 is thus internally threaded to receive fitting 48 and externally threaded to receive the nut 68.

The end cushion 65 is formed with a central socketlike recess or depression which receives in interfitting relation a raised portion 70 formed on the pressure member 21; an annular shoulder 71 of the raised portion 70 being circumferentially embraced by a relatively thick retaining wall 72 of the cushion 65. The interfitting relation of the raised portion 70 of the supporting or pressure plate 21 and the resilient cushion 65 on the end of the suspension device prevents lateral shifting movement of the latter.

A layer of rubber 73 lines the inside of the casing walls 56 and 57 and a similar layer 74 covers the outside of the pneumatic device, being continuous and integral with the cushions 64 and 65 at the ends thereof.

If desired, a relatively narrow annular band of woven fabric material, indicated at 76, may be incorporated in the rubber walls of the pneumatic casing at the end thereof adjacent the end plate 54. The woven fabric material 76, or, if desired, cord material arranged with the cords extending circumferentially around the casing, provides another portion 77 of the casing which is relatively inextensible and nonflexing in the same sense as the portion 57 is nonflexing. In this manner the pneumatic casing embodies an annular flexing portion substantially spherical-shaped which is disposed between substantially nonflexing cylindrical portions 57 and 77. Thus, while the helical compression spring 53 flexes throughout its length, the walls of the pneumatic chamber in which the spring is completely encased are flexed in a region of material of less length than the spring and which region is the region of greatest diameter of the casing walls.

A flaring lip 80 is formed on the annular wall of the socket 23. As shown in Fig. 4, the walls of the socket preferably embrace the walls of the nonflexing portion 57 of the casing for the major portion of the length thereof. The socket 23 may be formed of any suitable material such as pressed steel, and is welded or otherwise secured to the bearing member 24 by a radially directed flange 81.

As shown in Fig. 1, each of the front pneumatic devices 4 has the flexing portion 56 at the lower end thereof, while each of the rear pneumatic devices 5 has the flexing portion 56 toward the upper end thereof. Accordingly, while the raised portions 70 to engage the socketlike apertures in the cushion portions 65 of the pneumatic devices are formed on the pressure members 21 of the front suspension assemblies, similar raised portions (not shown) are formed on the pressure members 28 for the rear suspension assemblies. Also, each of the extensions 49 from the end plates 50 of the rear pneumatic devices extends through an aperture in one of the supporting plates 30. Preferably, the rear socket-forming members 32 which receive the nonflexing portions 57 of the rear suspension devices have removed portions 82 which permit the discharge therefrom of foreign material.

In Fig. 7 is shown a drum or mandrel 83 on which the walls of the pneumatic device, previously described, may be built. This mandrel is substantially cylindrical in form and may be collapsible or made of a steel tube. It is rotatably mounted on a shaft 84 and has a free end 85 over which the completed casing without the end plates and cushions can be removed from the mandrel.

In making one of the pneumatic devices, a sectional or collapsible core 86 which may be formed of wood or other similar material and has a central bore or removed portion, is placed about the mandrel 83 in proper relative position and held together by an annular elastic band 87. A layer of relatively thin, raw rubber sheet material 88 is then placed around the core 86 and extended a slight distance onto adjacent circumferential portions of the mandrel 83. Layers 89 and 90 of raw or uncured rubber sheet material corresponding in thickness to the layer 88 are placed around the mandrel 83 on opposite sides of the core 86 and in overlapping relation with the marginal portions of the layer 88. The layers 88, 89, and 90, when vulcanized, become the inner layer or lining 73 of the pneumatic casing. Layers of raw or unvulcanized rubber sheet material having the cords 59 and 60 incorporated therein are placed over the mandrel 86 on top of the rubber layer 88 and arranged so that the cords are disposed diagonally with respect to the longitudinal axis of the mandrel and so that the cords in the separate layers are disposed on a different diagonal or bias and at an angle with respect to one another. Layers of rubber sheet material having the diagonal cords 51 incorporated therein for reinforcement are then placed around the mandrel on top of the rubber layer 89 and in overlapping relation with respect to the marginal portions of the cord layers 59 and 60, as shown in Fig. 8. A plurality of layers of raw rubber sheet material having incorporated therein the woven fabric cords 52 and 58 are wrapped about the mandrel on top of the layers having the bias cords 51 and arranged so that the cords 58 extend circumferentially about the mandrel 83 so that in the completed pneumatic device they will be arranged as shown in Fig. 4. Similarly, layers or laminations having the woven cords 76 therein are placed about the mandrel 83 on the other end thereof from the plies having the cords 52 and 58 and on the opposite side of the wooden core 86.

Covering layers 91 and 92 of raw rubber sheet material are placed over the mandrel layers and core layers and have their marginal edges overlapped in the region 61 as shown in Fig. 8. When the article is completed the layers 91 and 92 become the integral outer rubber layer 74.

The inherent tackiness of the raw rubber in the several laminations making up the walls of the pneumatic casing holds the latter together while it is slid over the free end 85 of the mandrel 83, after which the core 86 is collapsed and removed therefrom. Preferably the mandrel 83 is initially covered with waxed or other paper or soapstone to facilitate the sliding therefrom of the assembled casing. The assembled casing walls are then placed over the spring 53, mounted as shown in Fig. 9. The spring is under compression, having the ends thereof drawn towards one another by the end plates 50 and 54, and held thus by rod 93 passed through the bore in the extension 49 of the plate 50 and threadedly secured in a boss 94 secured to the inside of the end plate 54. The end of the rod 93 which projects through the extension 49 is threaded and receives a nut 95 which bears against the outer end of the extension. The threaded end of the rod 93 beyond the nut 95 is received in a threaded chuck 96 which supports the assembly during further assembly. The end plates have previously had secured thereto the adhesive layers 63 of rubber impregnated woven fabric material. A layer 97 of raw rubber sheet material is then placed over each of the adhesive layers 63, after which the marginal ends of the casing walls are folded over the circumferential marginal edges of the end plates 50 and 54. An additional quantity of rubber is then superimposed on the rubber layers 97 and in overlapping relation with respect to the folded over ends of the casing to form the cushions 64 and 65.

The completely assembled device with the spring 53 retained under compression by the rod 93 is then removed from its supporting chuck 96 and placed in a suitable mold for curing and vulcanization in accordance with well known practice. A passage 98 is formed longitudinally through the threaded end of the rod 93 and communicates with the interior chamber 66 of the pneumatic device so that during vulcanization a suitable gas, such as carbon dioxide, may be forced thereinto for inflating the same.

The spring 53 is designed so that the compressive force exerted thereon by the end plates 50 and 54 as held by the rod 93 during manufacture of the device is substantially equal to the weight of the vehicle to be supported thereby. Accordingly, when the pneumatic devices are placed in position between the opposed spring beds or bearing surfaces of the vehicle 1, such as the pressure members 21 and bearing members 24, and the rods 93 removed, there will be substantially no change in the shape of the casings and substantially no change in the length of the suspension devices.

By inflating the chambers 66 of the devices through the fluid conduits 44 and 45, the capacity of the suspension devices can be adjusted in accordance with the load of the vehicle. Since this adjustment can be made individually for each of the suspension devices, the suspension system can be adjusted for unequal loads on the same vehicle. For example, if one side of the automobile should be loaded heavier than the other, the suspension device or devices supporting that side can be inflated to a higher pressure or pressures than the suspension devices on the other side of the car. Furthermore, this adjustment can be effected by the operator of the vehicle during travel thereof by means of the valves 40 through 43 located on the instrument panel and by visual observation of the gauges 47 the operator can tell the state of inflation of the several separate suspension devices.

Figure 6:
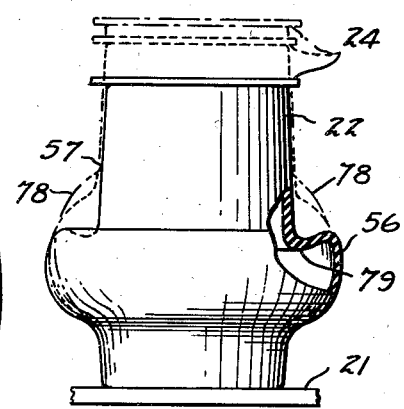
Fig. 6 is a diagrammatic elevational view showing the change in shape of the pneumatic casing of the suspension device under different load conditions.

One advantage of the pneumatic devices of the present invention is their compactness. As shown in Fig. 6, the deformation of the flexing portion of the pneumatic chamber walls is restricted so as not to objectionably interfere with surrounding parts of the automotive vehicle. For example, the rear suspension devices 5 are disposed so that the flexing portions 56 thereof partially overlie the axle housing 26. The front suspension devices 4, having the flexing portions 56 at the lower end thereof, can thus have the nonflexing portions 57 disposed in the relatively deeply drawn sockets 23 formed in the cross member 17 of the vehicle frame.

On account of the initial compression of the springs 53 during the manufacture of the suspension devices, they are considerably foreshortened from their natural or unstressed length. Accordingly, when riding over a bumpy or uneven highway a vehicle equipped with the suspension devices of the character described is afforded advantageous snubbing effect on the springs. If the spring 53 extends for a length greater than that to which it is compressed during manufacture of the suspension devices, the casing walls are longitudinally stressed, tending to elongation, and the flexing portion 56 is drawn radially inward to a position such as that indicated by broken lines 78, Fig. 6. This operation or elongation of the casing has a snubbing effect, tending to arrest or restrict the elongation of the springs beyond the length to which they are compressed during fabrication of the suspension devices. A downward compression or shortening of the springs 53 likewise effects a distortion of the rubber casing and causes a compression of the pneumatic fluid in the chamber 66 so that a cushioning or shock-absorbing action is produced. Under certain extreme compressive forces the rubber casing is distorted so that the flexing portion 56 may fold inside itself in a reverse curve as shown at 79 (Fig. 6) in which one portion is telescoped within another portion.

During axial or vertical elongation or shortening of the suspension devices the flexing portions 56 are not materially increased in diameter beyond their molded or vulcanized shape. In this manner objectionable radial distention of the device is avoided so as to minimize interference with other parts of the automotive vehicle.

Although but a single embodiment of the invention has been shown, the principles thereof can be utilized in numerous modifications, change being made in regard to details of construction and arrangement of parts as desired, it being understood that the embodiment shown in the drawings and described above is given for purposes of explanation and illustration.

What I claim is:

1. A suspension device comprising a pair of end members, an annular casing of rubber composition extending between the end members and having an annular relatively stiff and substantially non-flexing portion and an annular relatively yieldable flexing portion, said end members and casing being integrally joined together and enclosing a pneumatic cushioning chamber, the stiff portion of the casing being substantially cylindrical in shape and having substantially longitudinal and circumferential cords embedded therein for reinforcement and the flexing portion having substantially diagonally disposed cords embedded therein for reinforcement and being of larger diameter than the stiff portion, and means through which fluid can be introduced into said chamber or removed therefrom.

2. A suspension device to be installed in a vehicle, comprising a helical coil spring, a pair of end members having seats for the spring, removable means extending between the members to hold the spring under compression, resilient pads covering the seat members, and an annular resilient casing enveloping the spring and integrally joined to the pads adjacent the spring ends, said casing being in its normal unstressed shape while the spring is under compression.

3. A suspension device to be installed in a vehicle, comprising a helical coil spring, a pair of end members having seats for the spring, removable means extending between the members to hold the spring under compression, resilient pads covering the seat members, and an annular rubber casing enveloping the spring, said casing being in its normal unstressed shape while the spring is under compression and having reinforcing cords incorporated therein and extending diagonally around the casing to permit longitudinal flexing of the casing.

4. A suspension device to be installed in a vehicle, comprising a helical coil spring, a pair of end members having seats for the spring, removable means extending between the members to hold the spring under compression, resilient pads covering the seat members, and an annular rubber casing enveloping the spring, said casing having an annular relatively stiff and substantially non-flexing portion and an annular relatively yieldable flexing portion, said pads and casing being integrally joined together and enclosing a pneumatic cushioning chamber in which the spring is disposed.

5. A suspension device to be installed in a vehicle, comprising a helical coil spring, a pair of end members having seats for the spring, removable means extending between the members to hold the spring under compression, resilient pads covering the seat members, an annular rubber casing enveloping the spring, said casing having an annular relatively stiff and substantially non-flexing portion and an annular relatively yieldable flexing portion, said pads and casing being integrally joined together and enclosing a pneumatic cushioning chamber in which the spring is disposed, and reinforcing cords incorporated in the casing, said cords extending substantially longitudinally and circumferentially in the non-flexing portion of the casing and substantially diagonally in the flexing portion.

6. A suspension device comprising a helical coil spring, a pair of end seats for the spring, a rubber casing substantially enclosing the spring, and end seats in an airtight chamber and having rubber ends disposed across the outside of the end seats, an annular deformable portion of the casing surrounding the spring and arranged to flex therewith during variations of load, and an annular relative non-yielding portion of the casing surrounding the spring and being substantially without deflexion during load variations.

7. In a vehicle, a frame, a wheel, a pneumatic cushion and a spring for supporting the frame on the wheel, said cushion including a flexible casing enclosing a fluid-tight chamber and said spring being housed in said chamber, and the cushion and spring arranged so that the spring alone sustains normal loads while the casing of the cushion is substantially in its normal shape and an increased or decreased load on the supporting parts operates to distort the casing and the increased load is cooperatively borne by the spring and cushion.

8. The method of making and installing in a vehicle a suspension device having a helical coil spring enclosed in an airtight flexible and extensible casing which comprises initially compressing the spring axially, placing the spring within the casing while maintaining the compression therein, sealing the casing around the compressed spring while maintaining the casing in its normal unextended shape, securing the normal shaped casing containing the compressed spring in place in the vehicle, imposing a normal load on the device through the weight of the vehicle substantially equal to the force required to effect initial compression of the spring, and releasing the compressed spring except for the weight of the vehicle whereby the casing is maintained in its normal shape during normal loading of the device and is axially deformed by abnormal loading.

9. The method of making and installing in a load carrying vehicle a suspension device having a helical coil spring enclosed in an airtight flexible and extensible casing which comprises initially compressing the spring axially, placing the spring within the casing while maintaining the compression therein, sealing the casing around the compressed spring while maintaining the casing in its normal unextended shape, securing the normal shaped casing containing the compressed spring in place in the unloaded vehicle, imposing a normal load on the device through the weight of the vehicle substantially equal to the force required to effect initial compression of the spring, releasing the compressed spring except for the weight of the vehicle whereby the casing is maintained in its normal shape during normal loading of the device and is axially deformed by abnormal loading, applying an additional load on the device by loading the vehicle to compress both the spring and casing axially, and introducing air under pressure into the casing to elongate the casing axially to its normal shape and assist the spring in supporting the loaded vehicle.

10. The method of making a suspension device having a spring enclosed in an airtight flexible casing, which comprises forming a casing of uncured rubber compound having an opening therein, compressing the spring, inserting the compressed spring into the uncured casing through said opening, sealing the opening of the casing, and curing the rubber casing while maintaining the compression in the spring.

11. A suspension device to be installed in a vehicle, comprising a helical coil spring, a pair of end members having seats for the spring, rubber cushion pads disposed across the outside of the end members, the end members being held against the pads by the spring, an annular rubber casing enveloping the spring and integrally joined to the cushion pads, said casing having at one end thereof a relatively inextensible substantially cylindrical portion reinforced by woven fabric in which some of the cords extend circumferentially about the casing and others of the cords extend longitudinally of the casing, and said casing having adjacent the inextensible portion an outwardly bowed extensible portion of greater diameter than the inextensible portion but of less axial length and which extensible portion is reinforced by cords disposed diagonally with respect to the axis of the casing.

12. A suspension device comprising a helical coil spring, a pair of rigid end members having seats for the ends of the spring, rubber cushion pads over the end members, one of said members having a rigid portion extending through the cushion pad associated therewith, a flexible casing disposed about the spring and integrally joined to the cushion pads to form therewith an airtight chamber, an opening through said extension portion communicating with the chamber, and means for supplying fluid under pressure to said chamber through the opening.

13. A suspension device comprising a hollow casing of rubber or the like having a pair of oppositely disposed end members, the walls of the casing including an annular substantially cylindrical portion having reinforcing means embedded therein to make the same self-sustaining and relatively stiff and an annular self-sustaining substantially spherical portion of relatively yieldable and flexible composition, said spherical portion being of greater diameter than the cylindrical portion and connected to one end of the cylindrical portion to receive said end upon endwise movement of the cylindrical portion under load, and means through which fluid can be forced into the casing to inflate the same.

14. A suspension device comprising a hollow casing of rubber or the like having a pair of oppositely disposed end members, the walls of the casing including a pair of spaced substantially cylindrical portions having reinforcing means embedded therein to make the same self-sustaining and relatively stiff and an annular self-sustaining substantially spherical portion of relatively yieldable and flexible composition disposed between the cylindrical portions and connecting the latter, said spherical portion being of greater diameter than the cylindrical portions to receive an end of one of the cylindrical portions upon endwise movement of the cylindrical portions under load, and means through which fluid can be forced into the casing to inflate the same.

15. The method of making and installing in a vehicle a suspension device having a spring enclosed in an air-tight casing, which comprises compressing the spring, placing the compressed spring in the casing, closing the casing, securing the casing containing the compressed spring in the vehicle, releasing the compressed spring except for the compression caused by the vehicle, and forcing air into the casing and retaining the same therein to establish and maintain a pressure in the casing greater than atmospheric pressure.

HARVEY F. MARANVILLE.